Dec. 12, 1939.  J. J. NEUMAN  2,183,491
AUTOMATIC MOTOR CONTROL
Filed Sept. 9, 1938  2 Sheets-Sheet 1

INVENTOR
Jacob J. Neuman
By C. P. Goepel
his ATTORNEY

Dec. 12, 1939.　　　J. J. NEUMAN　　　2,183,491
AUTOMATIC MOTOR CONTROL
Filed Sept. 9, 1938　　　2 Sheets—Sheet 2
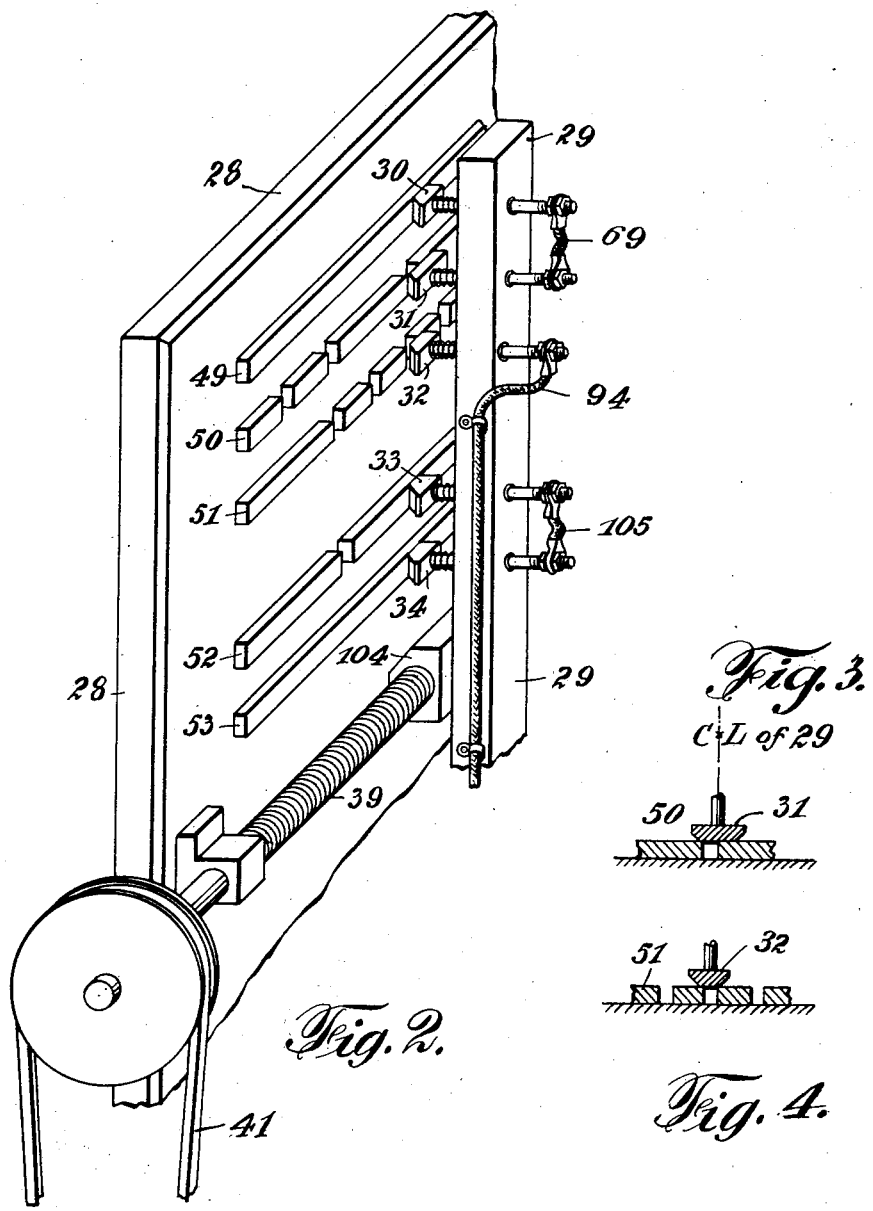

Patented Dec. 12, 1939

2,183,491

UNITED STATES PATENT OFFICE 2,183,491

AUTOMATIC MOTOR CONTROL

Jacob J. Neuman, South Salem, N. Y.

Application September 9, 1938, Serial No. 229,084

9 Claims. (Cl. 172—179)

This invention relates to automatic motor control and more especially to the control of a motor driving a centrifugal extractor machine of the type commonly used in sugar refining for separating the crystalline mass from a magma consisting of a mixture of crystals and liquor with the object of accomplishing this result with a minimum expenditure of power and a minimum amount of control equipment.

A primary object of the present invention is to provide a system of regenerative braking control which is an improvement over the system disclosed in my Reissue Patent 17,378 in that I have simplified the entire system and reduced the amount of control equipment required with corresponding increases in operating efficiency.

Another object of the invention is to provide certain safety features such as overload, no voltage, overcurrent field and weak field protection.

A further object is to control the motor by switching means interrupting low value current at each step.

Another object is to employ two contactors to make all voltage changes.

In order to obtain the best results in separation and obtain, as well, maximum duty from the centrifugal, positive and negative acceleration are accomplished as rapidly and the maximum speed made as great, as is consistent with the mechanical strength of the centrifugal. This is done not only to increase the production of the machine but also because of the fact that if the time of acceleration is prolonged the syrup or liquor will dry and adhere to the crystals before the machine attains a speed sufficient to separate the crystals and liquor. Also if the negative acceleration is prolonged the mass of crystals will harden making the removal thereof from the basket of the machine more difficult.

The windage and friction of the rotating parts of the loaded centrifugal are comparatively small due to the smooth surfaces exposed and the well made bearings used. While the charge in the basket loses some weight during the acceleration, this is a relatively small proportion of the weight of the rotating mass so that, when maximum speed is reached, a large proportion of the energy necessary to attain this speed is stored up as kinetic energy in the rotating mass and may therefore be recovered by the use of regenerative braking. In the ordinary methods of braking with mechanical brakes this kinetic energy is entirely dissipated in heat and wasted.

Although in the following description and drawings only the control for a single centrifugal extractor motor is illustrated, it is to be understood that in actual use several extractors would be grouped and driven by the energy supplied from a common power line, the energy recovered by the regeneration of one machine being negatively accelerated thereby being available to drive another machine being positively accelerated at the same time or to drive other motors or plant equipment connected to said power lines.

With the foregoing and other objects in view, the invention will be more fully described hereinafter, and will be more particularly pointed out in the claims appended hereto.

In the drawings, wherein like symbols refer to like or corresponding parts throughout:

Figure 2 is a fragmentary detail in perspective of the control bridge, and

Figures 3 and 4 are diagrammatic showings, in section, of two of the brushes of the control bridge showing them passing contacts.

Figure 1:
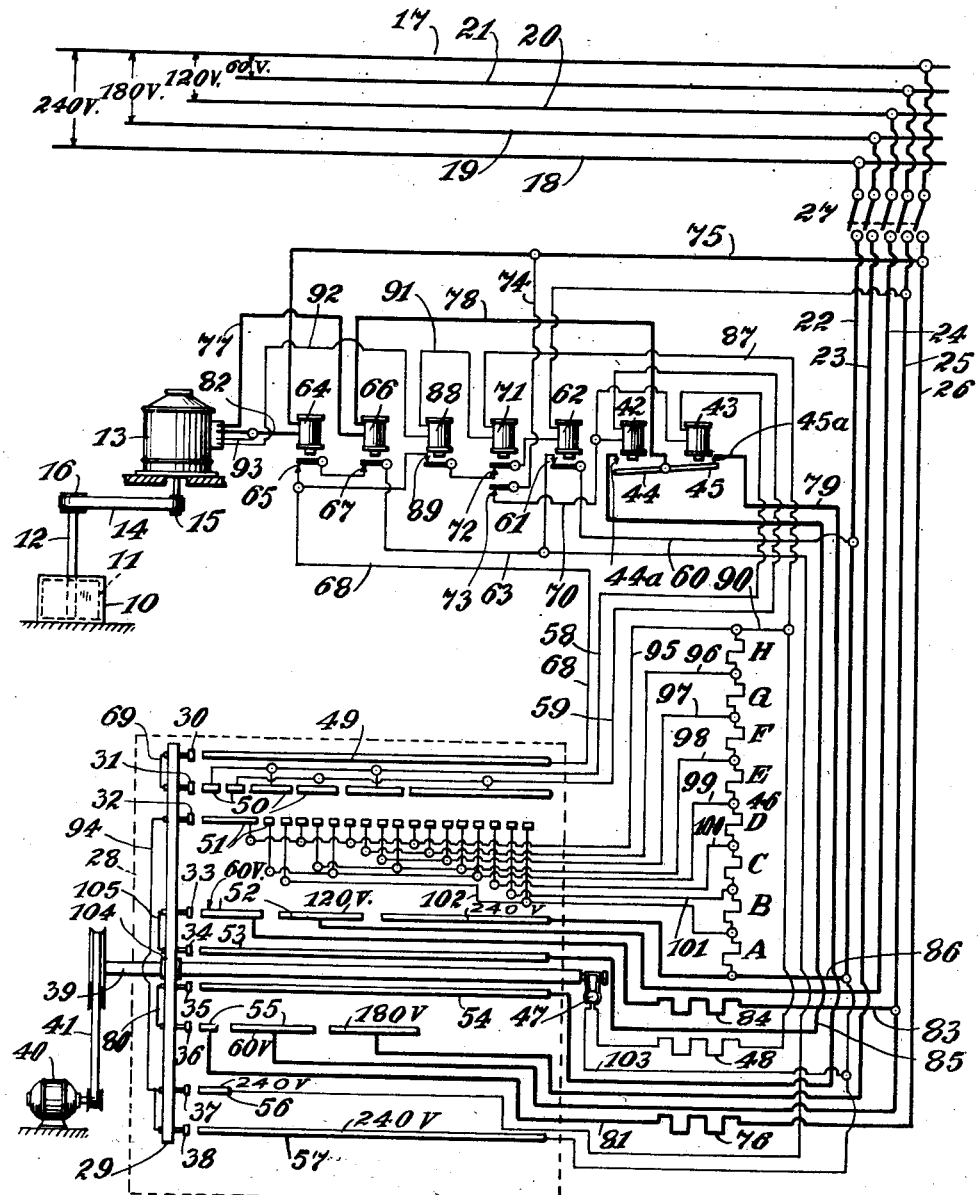
Figure 1 is a diagrammatic view of the entire system.

Referring to the drawings in detail the numeral 10 designates a centrifugal extractor machine containing the basket 11 supported by the spindle 12 and adapted to be rotated by the motor 13 which is belt connected thereto by the belt 14 and the pulleys 15 and 16.

The motor 13 in the embodiment described is a direct current shunt or compound wound dynamo-electric machine, preferably with interpoles, and is designed for a speed variation over a predetermined range by means of field control.

Energy is supplied from a five wire multivoltage system delivering potentials of 240, 180, 120, and 60 volts although this can be varied to fit individual needs. The potentials delivered are assumed to be maintained at sensibly constant values in accordance with general practice. The potential between wires 17 and 18 is 240 volts, between 17 and 19 is 180 volts, between 17 and 20 is 120 volts and between 17 and 21 is 60 volts. Auxiliary wires or taps 22, 23, 24, 25 and 26 are taken off of the main lines 17, 18, 19, 20 and 21 and have the five pole disconnect switch 27 or other current interrupting means interposed therein for the purpose of disconnecting the motor 10 and controls thereof from the main line when not in use.

The controller for the motor 10 consists of a panel 28 indicated by broken lines made of a suitable insulating material upon which are mounted several rows of metal segments, each row and the several sections of the rows being insulated from one another and adapted to be connected to various conducting wires, the function and operation of said segments being described in detail below. A bridge 29 also of a suitable insulating material and similar to the bridge described in my copending application No. 135,879, filed April 9, 1937, is mounted on a nut 104 engaging the screw 39 which is adapted to be rotated by the pilot motor 40 through the belt 41 to thereby move the said bridge 29 back and forth across the panel 28. The bridge 29 has mounted thereon the contact fingers or wipers 30, 31, 32, 33, 34, 35, 36, 37 and 38 which are adapted to slide along and engage in electrical contact with the rows of metal segments on the panel 28.

No wiring or control circuits are shown for the pilot motor 40 as this subject is not pertinent to the present application and is covered in detail in my aforementioned copending application. It is sufficient to say that the pilot motor 40 is automatically controlled to move the controller bridge 29 to the proper positions to give the driving motor 13 the correct speeds for the operations of charging, extracting and discharging the basket 11.

The contactors or relays 42 and 43 which perform the actual voltage changes have their armatures 44 and 45 interlocked so that it is impossible for the contacts on both contactors 42 and 43 to be closed at the same time, it being necessary to deenergize the coil of one before the armature of the other may pull in.

The general principle of the control may be described as follows:

In accelerating the motor 13 the armature is first connected to the 60 volt line in series with a small amount of resistance and maximum field excitation. Next the armature is connected direct to the 60 volt line still with maximum field excitation thus speeding up the motor 13. Now with the armature still connected to 60 volts direct, four units of the resistor 46 are connected in series with the field thus weakening it and resulting in further speeding up of the motor 13. Next three more units of the resistance 46 are connected in the field circuit further weakening the field and speeding up the motor 13 again. This being the maximum increase in speed with the armature on 60 volts that can be obtained the next step is to reconnect the armature to the 120 volt line and at the same instant to reduce the resistance 46 in the field circuit to zero thus compensating for the increase in armature voltage and resulting in only a small net increase in speed of the motor 13.

An important feature of this method of voltage tap switching is the fact that by increasing the field strength at the moment of changeover from 60 to 120 volts that the counterelectromotive force is brought to such a degree that the armature current is reduced to a very small value thus allowing the use of small capacity contactors 44 and 45 to perform the switching operation and also resulting in smaller maintenance costs. This is also true of the changeover from 120 to 180 and 180 to 240 volts.

The armature is now maintained at 120 volts and the field resistance increased in two steps thus resulting in two further increases in speed. The armature voltage is now increased to 180 volts and the field resistance reduced to zero and then increased in four steps thus resulting in further increases in speed. The armature is now connected to the 240 volt, or main line, and at the same time the field resistance 46 is again reduced to zero and then increased to the maximum value in eight steps of one unit at a time thus bringing the motor 13 up to the full operating speed. This is accomplished by having the contact finger 32, which controls the field resistance 46 shorter than the contact finger 31, which controls the changeover of the contactors 42 and 43. The contact finger 32 is also positioned on the bridge 29 somewhat nearer the slow speed end of the panel 28 as shown diagrammatically in Figure 3.

When the motor 13 has operated at full speed for the required interval of time the pilot motor 40 is started in a direction to move the controller bridge 29 towards the low speed end of the panel 28. The first effect of this being to close the switch 47 mounted on the end of the screw 39 thus shunting the resistor 48 across all of the units of the resistor 46 and increasing the field excitation of the motor 13. This results in causing the counterelectromotive force of the armature of the motor 13 to exceed the line voltage and instead of electrical energy flowing to the motor 13 from the 240 volt line it flows from the motor 13 now acting as a generator to the 240 line until the motor 13 is reduced to a speed where the counterelectromotive force of its armature again equals the line voltage of 240 volts. However, just before this point is reached the field resistance is again reduced keeping the counterelectromotive force of the motor 13 in excess of the line voltage and the motor 13 continues to deliver energy to the line. The resistance is reduced in a like manner until the field excitation is raised to a maximum and the motor 13 can no longer continue to deliver power to the main or 240 volt line and is, therefore, connected to the 180 volt line and continues to deliver power and provide a braking torque.

Likewise as the speed decreases it is connected in turn to the 120 volt and 60 volt lines, the field strength in each case being weakened at the moment of making the voltage changes and then being increased to full strength in gradual steps. This is the preferable practice in that it provides a more uniform braking torque and less variation in the current delivered. When field resistance on 60 volts is reduced to zero the motor 13 can no longer be slowed down additionally by regenerative braking and dynamic braking is resorted to in order to bring the motor 13 to a full stop.

This control is accomplished by the panel 28 in combination with the contactors 42 and 43 as will be specifically described hereinafter. Other relays shown, constitute protective devices and although desirable are not essential to the control and will be described later.

Control of the contactors 42 and 43 is accomplished by the feed segment 49 and the row of segments 50 alternate sections of said row 50 being connected to the coil of the same contactor by the wire 58 and 59 as shown.

The control will now be described step by step for a complete cycle of acceleration from full stop to full speed and then deceleration to full stop again.

When the wiper or contact finger 31 is in contact with the first section of the row of segments 50, the finger 30 is in contact with the feed segment 49 and a circuit is completed from the 240 volt line 22 through the wire 60 to the contact 61 of the relay 62, which is normally closed, thence through the wire 63 and the contacts 65 and 67 of the relays 64 and 66, also normally closed, to the wire 68 connected to the segment 49. Since the contact fingers 30 and 31 are connected by the jumper 69 energy now flows from the segment 49 to the first section of the row of segments 50 then through the wire 58 to the coil of contactors 43 and then through the wire 70, the contact 73, of relay 71, and the wires 74 and 75 to the negative line 26 thus impressing a potential of 240 volts on the coil of contactor 43 and causing it by reason of the magnetic force developed to attract the armature 45 and thus close the contact 45a. Since when the contact finger 31 is in contact with the first segment of the row 50, the contact finger 36 is in contact with the first segment of the row 55 and the contact finger 35 is in contact with the feed segment 54, the motor will not start as the armature is short circuited through the resistance 76 by the circuit formed from the armautre of motor 13 through the wire 77, the coil of relay 66, the wire 78, the contact 45a of the relay 43, the wire 79, the feed segment 54, the contact finger 35, the jumper 80, the contact finger 36 to the first section of the row of segments 55 thence through the wire 81, the resistance 76, the wire 26, the wire 75 through the coil of relay 64 and the wire 82 to the armature again. However, as the bridge 29 of the controller panel 28 moves to the right, as viewed in Figure 1, the contact finger 31 passes off of the first section of the row of segments 50 onto the second section, the contactor coil 43 is deenergized and the contactor coil 42 is energized thus opening the contact 45a and closing the contact 44a. Since the finger 33 of the bridge 29 is in contact with the first section of the row of segments 52 and the contact finger 34 is in contact with segment 53, this closes the armature circuit from the 60 volt line 25 through the wire 83 with the resistance 84 interposed therein to the first section of the row of segments 52, thence through the contact finger 33, the jumper 105, the contact finger 34, the segment 53, through the wire 85 to the contact 44 of the contactor 42, the wire 78, the coil of relay 66 and the wire 77 to the armature of motor 13 thence through the wire 82 to the coil of relay 64 and the wire 75 to the negative side of the line 26.

The field circuit of the motor 13 is formed from the 240 volt line 22 through the wire 86, the units A, B, C, D, E, F, G and H of the resistance 46, the wire 90, the wire 87, the coil of relay 71, the wire 91, the coil of relay 88 and the wire 92, to the field of the motor 13, thence from the field of the motor 13, through the wire 93, the wire 82, the coil of relay 64 and the wire 75 to the negative line 26. The field then has 240 volts impressed on it except as this is reduced by the resistance 46. The units, A, B, C, D, E, F, G and H of the resistance 46 are connected to various sections of the row of segments 51 on the panel 28 for the purpose of shunting out a portion or all of said sections of the resistance 46 to thus vary the amount of resistance in series with the field of the motor 13 and thereby vary the field excitation of said motor 13.

It is desirable to vary the field resistance 46 by the shunting out method described because even if the contact finger 32 fails to make contact with one of the segments of the row 51, the field circuit will not be opened. If the field circuit of a shunt motor is opened while the motor 13 is operating an unstable condition is produced and the motor continues to speed up until it flies to pieces.

When the contact finger 31 is in contact with the second section of the row of segments 50 thus impressing 60 volts on the armature of the motor 13 the contact finger 32 is in contact with the first section of the row of segments 51 and a circuit is formed from the 240 volt line 22 to which one end of the resistance 46 is also connected to the feed segment 57 and thence through the contact finger 38, the jumper wire 94, the contact finger 32, the said first section of the row of segments 51 and the wire 95 to the other end of the resistance 46 thus shunting out the entire resistance 46 and impressing 240 volts on the field of the motor 13 which, since it has its armature connected to the 60 volt line 22, as described, therefore starts up at slow speed.

As the controller bridge 29 continues to move to the right the contact finger 31 passes off of the second section of the row of segments 50 and passes on to the third section thereby deenergizing the contactor coil 42 and energizing the contactor coil 43 thus opening contact 44a and closing contact 45a. The armature circuit is now completed from the 60 volt line 25 to the second section of the row of segments 55, through the contact finger 36, the jumper 80 and the contact finger 35, to the feed segment 54, then through the wire 79, the contact 45a of the contactor 43, through the wire 79, the coil of relay 66 through the wire 77, the armature of the motor 13, the wire 82, the coil of relay 64, the wire 75 to the negative line 26 thus impressing 60 volts on the armature of said motor 13. At the same time since the contact finger 32 is in contact with the second section of the row of contacts 51 the shunt circuit around the field resistor 46 is changed and instead of the entire field resistor 46 being shunted out only units A, B, C and D are now shunted out the units E, F, G and H now being in series with the field of the motor 13 the remainder of the field circuit remaining the same. This results in the reduction of the field excitation of the motor 13 which therefore speeds up by an additional amount.

As the controller bridge 29 continues to move to the right, the contact finger 32 passes off of the second section of the row of segments 51 and onto the third section. However, since the third section of the row of segments 50 and the second section of the row of segments 55 both extend beyond the second section of the row of segments 52, the contact fingers 31 and 36 are still in contact with them, thus not altering the armature circuit for the moment. The field circuit of the motor 13 however, is now altered in that only unit A of the field resistor 46 is now shunted out, units B, C, D, E, F, G and H being in series with the field circuit of the motor 13, thus further reducing the field excitation of said motor 13 which therefore continues to speed up.

The controller bridge 29 continues to move to the right and the contact finger 31 passes off of the third section of the row of segments 50 and onto the fourth section thus opening the circuit through the coil of the contactor 43 and closing the circuit through the coil of the contactor 42 thereby opening the contact 45a and closing the contact 44a. The armature circuit of the motor 13 is now from the 120 volt line 24 to the second section of the row of segments 52 through the contact finger 33, the jumper 105 and the contact finger 34 to the feed segment 53, thence through the wire 85, the contact 44a of the contactor 42, the wire 78, the coil of relay 66, the wire 77 of the armature of motor 13, the wire 82, the coil of relay 64 and the wire 75 to the negative line 26 thus, impressing 120 volts on the armature of the motor 13. At the same instant that the contact finger 31 moved from the third section to the fourth section of the row of segments 50 thereby changing the armature from 60 to 120 volts potential the contact finger 32 moved from the third to the fourth section of the row of segments 51 thus completing the same circuit as when the contact finger 32 was on the first section of the row of segments 51 and raising the field excitation to 240 volts again since all the units of the field resistor 46 are now shunted out again. This change in the field circuit has the effect of slowing down the motor 13, however this effect is more than compensated for by the change in armature potential from 60 to 120 volts and the motor 13 continues to increase its speed. When the contact finger 31 first passed onto the fourth section of the row of segments 50, it was still in contact with the third section. The coils of both the contactors 42 and 43 were thus energized but due to the fact that the armatures 44 and 45 are interlocked and the armature 45 is in closer proximity to the contactor coil 43 than the armature 44 is to the contactor coil 42 it is thus seen that the contactors do not changeover as soon as the contactor coil 42 is energized. The moment of changeover occurs when the contact finger 31 leaves the third section of the segments 50 thus breaking the circuit to the contactor coil 43 and thereby allowing the contactor coil 42 to attract the armature 44 and close the contact 44a. Since the contact finger 31 is purposely made relatively long, it is thus seen that the centerline of the bridge 29 will be somewhat ahead of the space between the third and fourth sections of the row of segments 51 at the moment the contactors change. The length of the fingers 31 and 32 are so proportioned that in spite of the fact that the finger 32 is shorter and has its centerline lagging the centerline of the finger 31, it will still pass onto the fourth section of the row of segments 51 before the finger 31 leaves the third section of the row 50, as shown in Figure 3.

Therefore, all the units of the resistance 46 are shunted out and the field excitation is raised to the maximum value before the contactors 42 and 43 changeover. By raising the field excitation in this manner before making the voltage change in the armature circuit, the armature current is reduced and the amount of current that the contact 45a is required to interrupt is relatively small.. This is also true of the other voltage changes in the armature circuit.

The controller bridge 29 continues to move and the contact finger 32 shifts from the fourth to the fifth section of the row of segments 51. Since the fourth section of the row of segments 50 extends further than the fourth section of the row 51, the contactors 42 and 43 do not change at this time and the armature circuit remains on 120 volts. The field resistor 46 now has units A, B, C, D, and E shunted out and units F, G and H in series with the field circuit of the motor 13 thereby reducing the potential impressed on the field of said motor 13, and reducing the field excitation. The motor 13 therefore continues to increase its speed.

Next as a result of the continued motion of the bridge 29 to the right, the contact finger 36 passes off of the second section of the row of segments 55 and onto the third section. However, this has no immediate effect as the contact finger 31 is not yet in contact with the fifth section of the row of segments 50 and the contact 45a of the relay 43 is still in open circuit position and no energy can be delivered to the feed segment 54 or the said third section of the row of segments 55. This is a definite advantage for by this combination of segments and only two contactors it is possible to make six or more instantaneous changes in the potential delivered to the armature of the motor 13 without ever having the segments either interrupt or make the circuit since the contactors 42 and 43 change over before the contact finger 33 has left the segment to which the circuit is being opened and after the contact finger 36 has made contact with the segment to which the circuit is being closed.

At the same time that the contact finger 36 passed off the second section of the row of segments 55 and onto the third section, the contact finger 32 passed from the fifth to the sixth section of the row of segments 51 thus changing the shunt on the field resistor 46 so that only units A, B, C and D are shunted out and units E, F, G and H are in series with the field circuit of the motor 13 thereby further reducing the field excitation. The motor 13 therefore continues to increase its speed.

The contact finger 31 now passes from the fourth to the fifth section of the row of segments 50 thereby opening the circuit through the coil of the contactor 42 and closing the circuit through the coil of the contactor 43 thus causing the contact 44a to open and the contact 45a to close.

The armature circuit of the motor 13 is now completed from the 180 volt line 23 to the third section of the row of segments 55 through the contact finger 36, the jumper 80 and the contact 35 to the feed segment 54, thence through the wire 79, the contact 45a of the contactor 43, the wire 78 the coil of the relay 66 and the wire 77 to the armature of the motor 13, thence through wire 82, the coil of relay 64 and the wire 75 to the negative line 26, thereby impressing 180 volts on the motor 13. At the same instant that the contact finger 31 moved from the fourth to the fifth section of the row of segments 50, thereby changing the armature from 120 to 180 volts potential, the contact finger 32 moved from the sixth to the seventh section of the row of segments 51 thus completing the same shunt circuit as when the contact finger 32 was on the first or the fourth section of the row of segments 51 and raising the field excitation to 240 volts again since all the units of the field resistor 46 are again shunted out. This increase in the field excitation has the effect of slowing down the motor 13, but this is more than compensated for by the change in armature potential from 120 to 180 volts and the motor 13 continues to accelerate.

The contact finger 32 now continues to move and passes over the seventh, eighth, ninth and tenth sections of the row of segments 51, thus removing the shunt from the units H, G and F, of the field resistor 46, one at a time and thereby reducing the field excitation and increasing the speed of the motor 13 in three additional steps.

The contact finger 31 now passes from the fifth to the sixth section of the row of segments 50 thus shifting the armature from 180 to 240 volts in the same manner that the change was made from 120 to 180 volts and at the same instant the field excitation is increased to 240 volts as the contact finger 32 moves from the tenth to the eleventh section of the row of segments 51.

The armature of the motor 13 now remains at 240 volts potential and the contact finger 32 passes over the eleventh, twelfth, thirteenth, fourteenth, fifteenth, sixteenth, seventeenth and eighteenth sections of the row of segments 51 thus removing the shunt from the units of the field resistor 46 one at a time until all but the unit A is in series with the field circuits of the motor 13. The contact finger 32 now passes beyond the eighteenth section of the row of segments 51 thus removing the shunt from the unit A of resistor 46 and the entire field resistance 46 is now in series with the field of the motor 13 which is now at full speed. The sixth section of the row of segments 50 and the third sections of the row of segments 52 and the segments 49 and 53 all extend beyond the eighteenth section of the row of segments 51 so that the armature circuit is maintained, even though the contact finger 32 is no longer in contact with any of the row of segments 51.

At this time, the pilot motor 40 is automatically stopped, as described in my aforementioned copending application, and the controller bridge 29, carrying the contact fingers stops.

The motor 13 now operates at this full speed for a predetermined time and the pilot motor 40 is then automatically started in a reverse direction such as will rotate the screw 39 to move the controller bridge 29 to the left as viewed in Figure 1. As soon as the screw 39 begins to turn, the switch 47 frictionally mounted thereon is swung into a circuit closing position and a shunt circuit around the field resistor 46 is closed. This is comprised of the wire 103 connected to the 240 volt line, to which the unit A of field resistor 46 is also connected, the switch 47, the resistor 48 and the wire 87 connected to the unit H of the field resistor 46 by wire 90. This allows more current to flow in the field circuit of the motor 13 and therefore raises the field excitation. As a result the magnetic lines of force developed by the field of the motor 13 and cut by the conductors of the armature are increased in number and the counterelectromotive force of the armature is thereby increased since it is determined by the rate of cutting of magnetic flux. Due to this increase in the counterelectromotive force, it now exceeds the line voltage of 240 volts and electrical energy now flows from the motor 13 to the line, the energy being supplied by the kinetic energy of the mass of sugar in the rotating basket 11, the weight of the basket itself and the armature of the motor 13. The basket 11 and the motor 13 are therefore slowed down due to the torque developed and the speed tends to approach a value where the rate of cutting of magnetic flux in the motor 13 is of such a value that the counterelectromotive force of the motor 13 is reduced to an amount where just sufficient current flows to the armature from the line to overcome the losses due to loss of heat, to friction and to windage of the moving parts. However, due to the fact that the contact finger 32, on the bridge 29, is moving to the left it now comes in contact with the eighteenth section of the row of segments 51 and the unit A of the field resistor 46 is therefore shunted out reducing the resistance in the field circuit of the motor 13 and thereby further increasing the field excitation. The counterelectromotive force of the armature of the motor 13 is thus raised and energy continues to flow from said motor 13 to the 240 volt line. The motor 13 therefore continues to decelerate. The units A, B, C, D, E, F G and H of the resistor 46 are all shorted out one at a time as the contact finger 32 passes over the eighteenth, seventeeth, sixteenth, fifteenth, fourteenth, thirteenth, twelfth and eleventh sections of the row of segments 51.

The contact finger 31 now passes from the sixth to the fifth section of the row of segments 50 thus opening contact 44a of the contactor 42 and closing contact 45a of the contactor 43 and shifting the armature potential to 180 volts. At the same time, the contact finger 32 passes from the eleventh to the tenth section of the row of segments 51 thereby removing the shunt from units F, G and H of the field resistor 46. This lowers the field excitation and therefore the counterelectromotive force of the motor 13 to a value somewhat in excess of 180 volts and the motor 13 continues to deliver energy to the 180 volt line and said motor 13 continues to slow down. Since in this case the finger 32 leads the finger 31 and as described before is relatively shorter than said finger 32 it leaves the eleventh section of the row of segments 51 before the finger 31 leaves the sixth section of the row of segments 50 and the field is thus weakened and the armature current reduced to a small value before the voltage change is made by the contactors 42 and 43.

As the contact finger 32 contacts the ninth, eighth and seventh sections of the row of segments 51, the units F, G and H of the field resistance 46 are shunted out in succession thereby causing the field excitation to maintain the flow of current to the 180 volt line as the motor 13 slows down.

The contact finger 31 now passes from the fifth to the fourth section of the row of segments 50 thus opening contact 45a of the contactor 43 and closing contact 44a of the contactor 42 and thereby shifting the armature from 180 to 120 volts since the contact finger 33 is now in contact with the second section of the row of segments 52 which is connected to the 120 volt line 24. At the same time the contact finger 32 passes onto the sixth section of the row of segments 51 thus removing the shunt from units E, F, G and H of the field resistor 46. The motor 13 now delivers energy to the 120 volt line and as it is decelerated the units E, F, G and H of field resistor 46 are again shorted out to maintain the counterelectromotive force above 120 volts.

The contact finger 31 now makes contact with the third section of the row of segments 50 and the contactors 42 and 43 operate again closing the contact 45a and opening the contact 44a and shifts the armature to the 60 volt line since the contact finger 36 is now in contact with the second section of the row of contacts 55 which is connected to the 60 volt line 25. At the same time the contact finger 32 passes from the fourth to the third section of the row of segments 51 and reduces the field excitation by removing the shunt from all but the A unit of the field resistor 46. The resistances B, C and D are now shunted out as the contact finger 32 passes onto the second section of the row of segments 51 and then the remaining units E, F, G and H are shunted out as it passes onto the first section of the row of segments 51.

The field excitation is now maintained at 240 volts and the contact finger 31 passes from the third to the second section of the row of contacts 50 thus opening the contact 45a of the contactor 43 and closing the contact 44a of the contactor 42. This completes the armature circuit from the first section of the row of segments 52 through wire 83 and the resistor 34 to the 60 volt line 25. Since the resistor 84 is now in series with the armature of the motor 13, the armature potential is therefore reduced somewhat below 60 volts.

The contact finger 31 now passes from the second to the first section of the row of contacts 50 and the contact 44a of the contactor 42 is now opened and the contact 45a of the contactor 43 is closed. Since the contact finger 36 is now in contact with the first section of the row of segments 55 the armature is shorted through the resistor 76 and the energy of the motor 13 is dissipated by this resistor 76 therefore bringing the motor 13 to a full stop by dynamic breaking.

The pilot motor 40 is now automatically reversed and the cycle repeated over again and so on indefinitely.

In the event that the driving motor 13 becomes overloaded due to any cause either the overload relay 64 or the relay 66 or both will have excess current flowing in their coils and will open the contacts 65 and 67. This opens the circuit from the positive 240 volt line 22 through the contactor 42 and allows the contact 44a to open thus opening the armature circuit of the motor 13. This also opens the circuit through the no voltage relay coil 62 and the contact 61 of this relay also opens. Of course, as soon as the contact 44a of the contactor 42 opens the armature circuit, the coils 64 and 66 are de-energized and the contacts 65 and 67 return to closed position. However, since the contact 61 of the no voltage relay 62 is now open there is no circuit through the contactor coil 42 and the contact 44a remains open and the armature circuit is not closed. After the cause of the overload has been determined and repairs made, the operator reverses the pilot motor 40 and the bridge 29 moves to the left until the contact finger 37 makes contact with the contact strip 56 on the panel 28 thereby bridging the open contact 61 of the no voltage relay 62. This completes the circuit through the coil of the no voltage relay 62 and the contact 61 is reset. The contactor 43 is now closed and as soon as the bridge 29 moves to the right again the motor 13 starts up as described above.

In the event that, if for any reason, the field current of the motor 13 becomes excessive the field relay contact 72 will be opened thus deenergizing the no voltage relay coil 62, opening the contact 61 and as before the contact 44a of the contactor 42 will open. If for any reason the opening of contact 72 of the field relay 71 fails to trip out the contact 44a of the contactor 42 by opening the contact 61 of the no voltage relay 62, the contact 73 of the field relay 71 will open at a slightly greater current and interrupt the circuit from the contactor coils 42 and 43 to the negative line 26 and allow the contacts 44a and 45a to open.

If the field circuit of the motor 13 is opened or weakened below a safe value the contact 89 of the relay 88 opens and the no voltage relay contact 61 will also open with the same effect as above.

In each case described, it is necessary that the bridge 29 be brought to slow speed end of the panel 28 and the motor 13 accelerated again in the usual manner since it would be very dangerous to reconnect the motor 13 directly to the 240 volt line 22 after it had slowed down by any appreciable amount.

What is claimed is:

1. A device for controlling acceleration and deceleration of a motor from a multi-voltage supply comprising a plurality of contacts, a traveling bridge disposed to traverse said contacts, a first set of connectors between certain of said contacts and the armature of said motor, a second set of connectors between other of said contacts and the field of said motor, some of said second set of connectors having resistors of various resistances therein, and a third set of connectors between still other of said contacts and said multi-voltage supply, contactors on said bridge for engagement with said contacts; said contacts and connectors and contactors being disposed relatively to impress a low voltage on said armature and a high voltage on said field as the bridge starts to traverse said contacts, thereafter to maintain the armature voltage constant and decrease the field voltage step by step by connecting the field through certain of said second set of connectors having resistors therein, thereafter to increase the armature voltage and immediately to increase the field voltage and then step by step to decrease the field voltage by connecting the field through certain of said second set of connectors having resistors therein, thereafter to reverse the manner of connection to decelerate the motor by successively increasing field voltage, decreasing armature voltage and immediately decreasing field voltage, and increasing field voltage.

2. In a motor control system having sets of contacts and a traveling bridge with contactors thereon, a magnetic voltage changing switch comprising a pair of magnetic coils, an armature pivoted to swing towards one or the other of said coils whereby only one coil affects the armature at a time, means associated with the said armature to close one circuit when the armature is swung towards one coil and another circuit when the armature is swung towards the other coil, said traveling bridge operating to connect one circuit of said circuit closing means to a power supply and then to energize the one of said coils to swing the armature to close the circuit.

3. In a motor control system a voltage change-over comprising a series of spaced contacts, a pair of solenoids, alternate contacts of said series being connected to the same solenoid, an armature rockably mounted adjacent said solenoids for attraction to one or the other thereof, armature contacts disposed to close different circuits when the armature is rocked towards one solenoid or the other, means including a second series of spaced contacts for connecting said armature contacts separately with current supplies of varying strengths, and means including contactors for traveling over said series of contacts whereby to energize the solenoids alternately and to connect said armature contacts separately so that said armature is rocked alternately to close circuits with current supplies of varying strengths.

4. A motor control system comprising a plurality of connections for different voltages and motor field and armature, sets of contacts connected to said connections, a reversible traversing bridge having contactors for engaging said contacts, said contacts and contactors being disposed whereby the contactors first close circuits through the motor armature at low voltage and through the motor field at high voltage, thereafter as the bridge traverses the contacts to maintain the low voltage armature circuit and to close a circuit through the field at reduced voltage, thereafter as the bridge traverses the contacts to close a circuit through the motor armature at higher voltage and close a circuit through the field at high voltage, thereafter as the bridge traverses the contacts to maintain the higher voltage armature circuit and to close a circuit through the field at reduced voltage, and means for reversing the traverse of the bridge for reversing the order of changing circuit voltages to decelerate the motor.

5. In a motor control system an armature circuit control relay, overload relays for armature and field operative in the event of overload to operate the armature relay to open the armature circuit, and a no-voltage relay for controlling the high voltage current supply and also operated by said overload relays to cut off high voltage in the event of overload, the no-voltage relay holding the high voltage current supply circuit open even after the overload relays are deenergized by the opening of the armature circuit.

6. In a motor control system a no-voltage relay for controlling high voltage, a field current relay having two armatures operative at different overloads, a motor armature circuit control with two relays for controlling armature voltage, the weaker one of said field current relay armatures controlling the circuit of one of the motor armature control relays and the stronger field current relay armature controlling the general circuit of both of said motor armature control relays.

7. In a motor control system a no-voltage relay for controlling high voltage supply, and a field undercurrent relay in series with the no-voltage relay whereby to open the high voltage supply circuit when the field current drops below the operating value of said field relay.

8. In a control for a motor, a control panel, a travelling bridge mounted to traverse the panel, a series of contacts on the panel and a contactor on the bridge for changing armature voltage, a second series of contacts on the panel and a second contactor on the bridge for varying field strength, said contacts and contactors being arranged so that as the bridge advances to accelerate the motor the field strength is momentarily increased and the armature voltage then raised, and so that as the bridge moves in the opposite sense to decelerate the motor the field strength is momentarily weakened and the armature voltage then decreased, whereby the armature current is maintained low during the armature voltage changeovers.

9. In a control for a motor, a control panel, a travelling bridge mounted to traverse the panel, a series of contacts on the panel and a contactor on the bridge for changing armature voltage, a second series of contacts on the panel and a second contactor on the bridge for varying field strength, the first said contactor being longer and positioned slightly ahead of the said second contactor in the direction of panel traverse during acceleration, said contacts being arranged so that as the bridge advances to accelerate the motor the second contactor momentarily increases the field strength and the first said contactor lying ahead of the said second contactor makes the armature voltage changeover before the field strength is decreased again, said contacts being arranged further so that as the bridge moves to decelerate the motor the second contactor momentarily decreases the field strength and the first said contactor being longer than the said second then makes the armature voltage changeover before the field strength is increased again.

JACOB J. NEUMAN.

CERTIFICATE OF CORRECTION.

Patent No. 2,183,491. December 12, 1939.

JACOB J. NEUMAN.

It is hereby certified that the above numbered patent was erroneously issued to the inventor, said "NEUMAN", whereas said patent thould have been issued to United States Patent Development and Royalty Company, of South Salem, New York, a corporation of New York, as assignee of the entire interest therein, as shown by the record of assignments in this office; and that the said Letters Patent should be read with this correction therein that the same may conform to the record of the case in the Patent Office.

Signed and sealed this 13th day of February, A. D. 1940.

(Seal)

Henry Van Arsdale,
Acting Commissioner of Patents.